United States Patent Office.

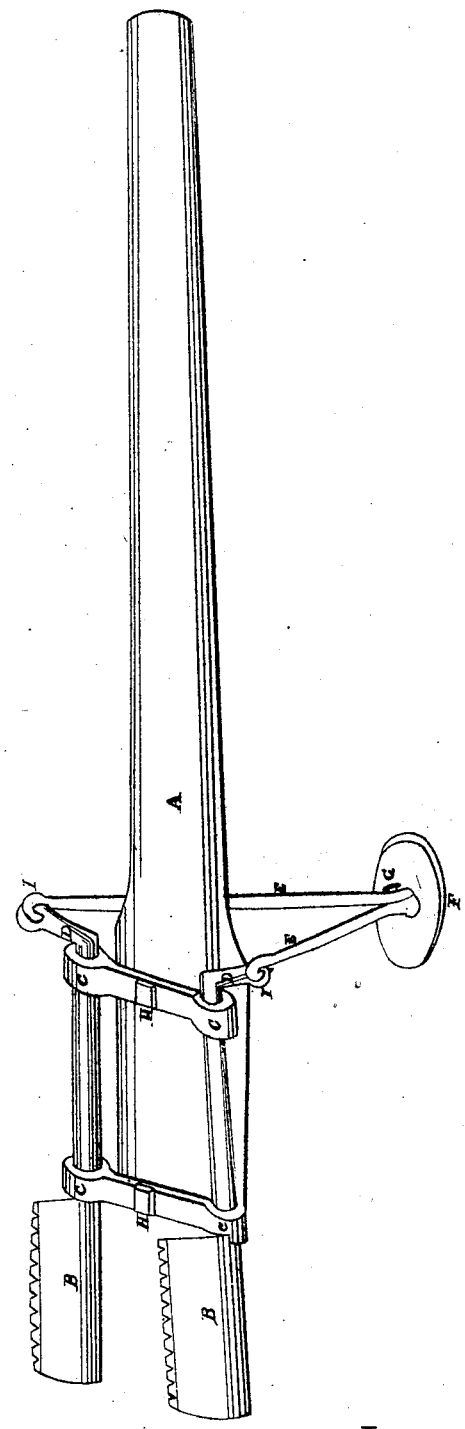

JAMES R. WOODWORTH, OF NUNDA, NEW YORK.

Letters Patent No. 73,482, dated January 21, 1868.

IMPROVEMENT IN DEVICE FOR PULLING HOP-POLES.

*The Schedule referred to in these Letters Patent and making part of the same.*

TO ALL WHOM IT MAY CONCERN:

Be it known that I, JAMES R. WOODWORTH, of the town of Nunda, county of Livingston, in the State of New York, have invented a new and improved Device for Pulling Hop-Poles, &c.; and I do hereby declare that the following is a full and exact description thereof, reference being had to the accompanying drawings, and to the letters of reference marked thereon.

The nature of my invention consists in providing a lever with jaws, which are opened and closed by a rolling motion, and are opened by the heft of the fulcrum, and closed by the weight of the bars resting on this fulcrum.

To enable others to make and use my invention, I will proceed to describe its construction and operation.

A, the lever, on which are fastened the jaws B B, of any convenient shape, by means of the cross-pieces or boxes C C C C, which are bolted to the levers at H H. D D are arms, attached to the shank of the jaws at the end, or any other part thereof. The ends of the arm D D are provided with holes to receive the rods E E, which, with the foot F, form the fulcrum. One rod is fastened to the others by a joint, G, so that they can spread and contract in working.

The operation is as follows: The workman holds the instrument clear from the ground, when the weight of the fulcrum, on the arms D D, rolls the jaws outward, which opens them. He then places them to the pole and rests the instrument on the fulcrum, which rolls the jaws inward, to grasp the pole. It is loosened from the pole by raising it from the ground.

What I claim as my invention, and desire to secure by Letters Patent, is the following:

The jaws B B, fulcrum F, joint G, rods E E, in combination with the handle or lever A, constructed substantially in the manner herein shown and described.

JAMES R. WOODWORTH.

Witnesses:
 LYMAN STILSON,
 NELSON BREWER.